(12) United States Patent
He et al.

(10) Patent No.: US 6,813,244 B1
(45) Date of Patent: Nov. 2, 2004

(54) AVAILABLE BANDWIDTH MEASUREMENT WITH VARIABLE SPEED PROBING AND ZOOM-IN/ZOOM-OUT TECHNIQUE

(75) Inventors: Jingsha He, Plano, TX (US); Tomohiko Taniguchi, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 767 days.

(21) Appl. No.: 09/717,441

(22) Filed: Nov. 20, 2000

(51) Int. Cl.$^7$ .......................... H04L 12/28; H04L 12/56
(52) U.S. Cl. ................... 370/235; 370/241.1; 370/252; 370/395.21
(58) Field of Search ............................ 370/235, 230, 370/236, 236.1, 241.1, 234, 252, 253, 248, 254, 395.21

(56) References Cited

U.S. PATENT DOCUMENTS

| | | | |
|---|---|---|---|
| 5,367,523 A | | 11/1994 | Chang et al. ............... 370/84 |
| 5,477,531 A | * | 12/1995 | McKee et al. .............. 370/249 |
| 5,627,970 A | | 5/1997 | Keshav .................. 395/200.13 |
| 5,706,281 A | * | 1/1998 | Hashimoto et al. ......... 370/252 |
| 5,734,825 A | | 3/1998 | Lauck et al. ........... 395/200.13 |
| 5,812,528 A | | 9/1998 | VanDervort ................. 370/235 |
| 5,907,556 A | | 5/1999 | Hisanaga et al. ........... 370/468 |
| 6,038,216 A | | 3/2000 | Packer ....................... 370/231 |
| 6,215,774 B1 | * | 4/2001 | Knauerhase et al. ........ 370/252 |
| 6,683,856 B1 | * | 1/2004 | Brinkman et al. .......... 370/249 |

OTHER PUBLICATIONS

Barford, et al., "Measuring Web Performance in the Wide Area", Performance Evaluation Review, Apr. 26, 1999, pp. 1–19.

Goyal, et al., "Determining End–to–End Delay Bounds In Heterogeneous Networks", In Proceedings of Workshop on Network and OS Support for Audio–Video, 4/95, pp. 287–298.

Paxson, "End–to–End Routing Behavior in the Internet", IEEE/ACM Transactions on Networking, Vo. 5, No. 5, 10/97, pp. 601–615.

Obraczka, et al., "The Performance of a Service for Network–Aware Applications", Computer Science Dept.—University of Southern California Technical Report, 97–660 10/97, pp. 1–17.

Paxson, "End–to–End Internet Packet Dynamics", IEEE/ACM Transactions on Networking, vol. 7, No. 3, 6/99, pp. 277–292.

Paxson, "Towards a Framework for Defining Internet Performance Metrics", LBNL–38952, Jun. 20, 1996, pp. 1–13.

Kalampoukas, et al., "Two–Way TCP Traffic over ATM:Effects and Analysis", Proceedings of IEEE Infocom '97, UCSC–CRL–95–??, Oct. 1, 1996, 4/97, Abstract and pp. 1–27.

Adams, et al., "The Use of End–to–end Multicast Measurements for Characterizing Internal Network Behavior*", to appear in IEEE Communications, Jan. 31, 2000, pp. 1–10.

Allman, et al., "On Estimating End–to–End Network Path Properties*", ACM SIGCOMM '99, pp. 1–12, '99.

Lai, et al., "Measuring Bandwidth", Proceedings of IEEE Infocom '99, 3/99, 11 pages.

* cited by examiner

*Primary Examiner*—Hassan Kizou
*Assistant Examiner*—Timothy Lee
(74) *Attorney, Agent, or Firm*—Christie, Parker & Hale, LLP (57) ABSTRACT

An available bandwidth measurement system and method.

The available bandwidth of a network path is determined by determining round-trip times of packets utilizing varying bandwidth to a receiving node. An increase in packet round-trip time indicates congestion of a link in the path. In some embodiments, the bandwidth range measured is expanded or decreased to locate a congestion point or to provide greater precision in determining available bandwidth.

28 Claims, 8 Drawing Sheets

AVAILABLE BANDWIDTH MEASUREMENT WITH VARIABLE SPEED PROBING AND ZOOM-IN/ZOOM-OUT TECHNIQUE

BACKGROUND OF THE INVENTION

This invention relates generally to determination of network characteristics, and more specifically to systems and methods for determining available bandwidth of a path between two network points.

Computers within a computer network communicate over paths made up of physical links. The paths may be simple point-to-point links, for example-two computers linked directly together. More commonly, computer networks include a significant number of computers, with potentially multiple paths between computers. Moreover, each path may be comprised of multiple links, with each link being bounded by a node, and potentially some of the multiple paths may share some common links.

With the large number of computers potentially attached to networks, as well as potentially large data transfers over the paths, efficient allocation of paths becomes problematic. In addition, often data requested by a computer may be available from a number of sources. Such a situation may be found, for example, when multiple redundant servers are available to service a client. In order to efficiently allocate paths and sources, some knowledge of available bandwidth between any two network nodes is helpful.

Available bandwidth, however, is a dynamic parameter. That is, depending on the number of users of any path, or of any of the links making up the path, as well as the quantity of data being passed from or to users at any particular moment, the available bandwidth on the path may change drastically. In particular, available bandwidth is a function of network physical capacity and network traffic levels. Physical capacity of the network may change on a relatively infrequent basis, due to such circumstances as network upgrades, node failures within the network, and other factors. Network traffic, on the other hand, often may exhibit a high rate of change. Determination of available bandwidth, therefore, should occur on a relatively frequent basis in order to increase usefulness in allocating paths and resources.

SUMMARY OF THE INVENTION

The present invention provides a method of determining a network characteristic, which in one embodiment is available bandwidth of a path. In one embodiment, the method includes transmitting over a network a plurality of transmitted packets to a recipient destination, and receiving over the network a plurality of received packets from the recipient destination. In the one embodiment, each of the plurality of received packets has a correspondence with packets of the plurality of the transmitted packets. The network further comprises determining a characteristic of the network based on time differences between transmission and reception of the corresponding transmitted packets and received packets.

In a further embodiment, the present invention comprises a method of determining bandwidth characteristics of a communications path. The communications path is between a source node and a destination node, and the method include sending a first series of packets through the destination node, with a series of packets being separated in time, with a decreasing separation of time between subsequent packets in the series. The method also comprises receiving a second series of packets from the destination node with each of the packets in the second series of packets having a correspondence with a packet in the first series of packets, and determining a round trip time for each of the corresponding packets. In one embodiment, the method further comprises determining which corresponding packets in the series exhibits an increase in round trip time with respect to prior corresponding packets in the series.

These and other aspects of the present invention are more readily understood when considered in conjunction with the accompanying drawings and the following detailed description.

DETAILED DESCRIPTION

Figure 1:
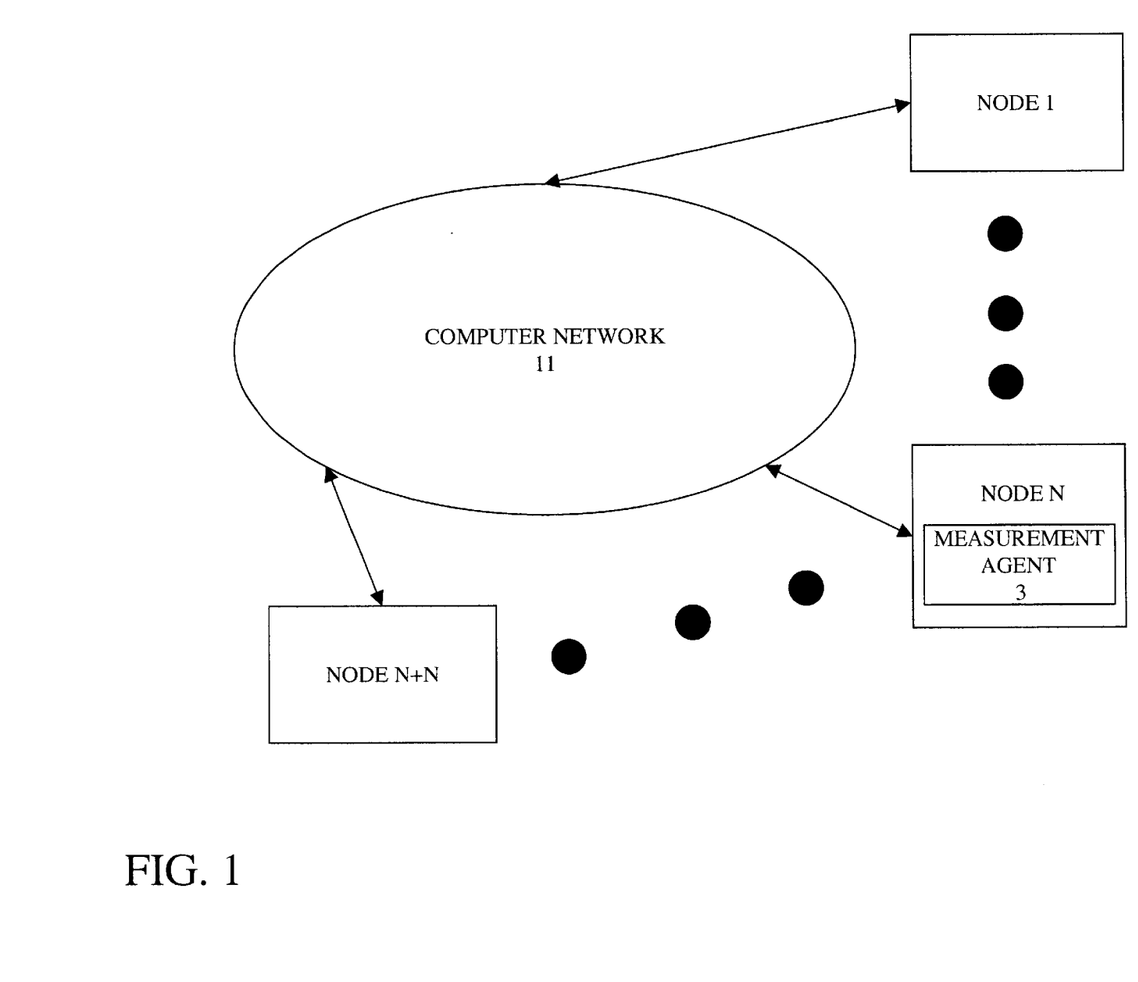
FIG. 1 illustrates a computer network.

FIG. 1 illustrates a computer network including a measurement agent in accordance with the present invention. The computer network 11 links a number of nodes. Each of the nodes is comprised of a computer or other network element. As illustrated, a plurality of nodes are each linked to the rest of the nodes forming the computer network by a link.

The link between the various nodes of the computer network are not completely known to any one node. For example, node N is in communication with node 1 by way of the computer network, but the number of individual links in a path between node N and node 1 is not known to node N. Furthermore, the physical characteristics of the links between the various nodes in the path between node 1 and node N are also not known to node N. Thus, while individual nodes forming the computer network are in communication with each other, knowledge of the number of links forming such a path, or the physical nature of such links, is not necessarily known by any particular node.

In accordance with aspects of the present invention, a measurement agent 3 residing on a node on the network determines a characteristic of the network. The measurement agent acts by transmitting a message, or packet, to another node on the network. In one embodiment, the message is of a nature such that the receiving node transmits a return message to the transmitting node upon receipt of the message. The measurement agent thereafter performs calculations with respect to transmission and reception of the message and return message, respectively, to determine a network characteristic, particularly available bandwidth.

Figure 2:
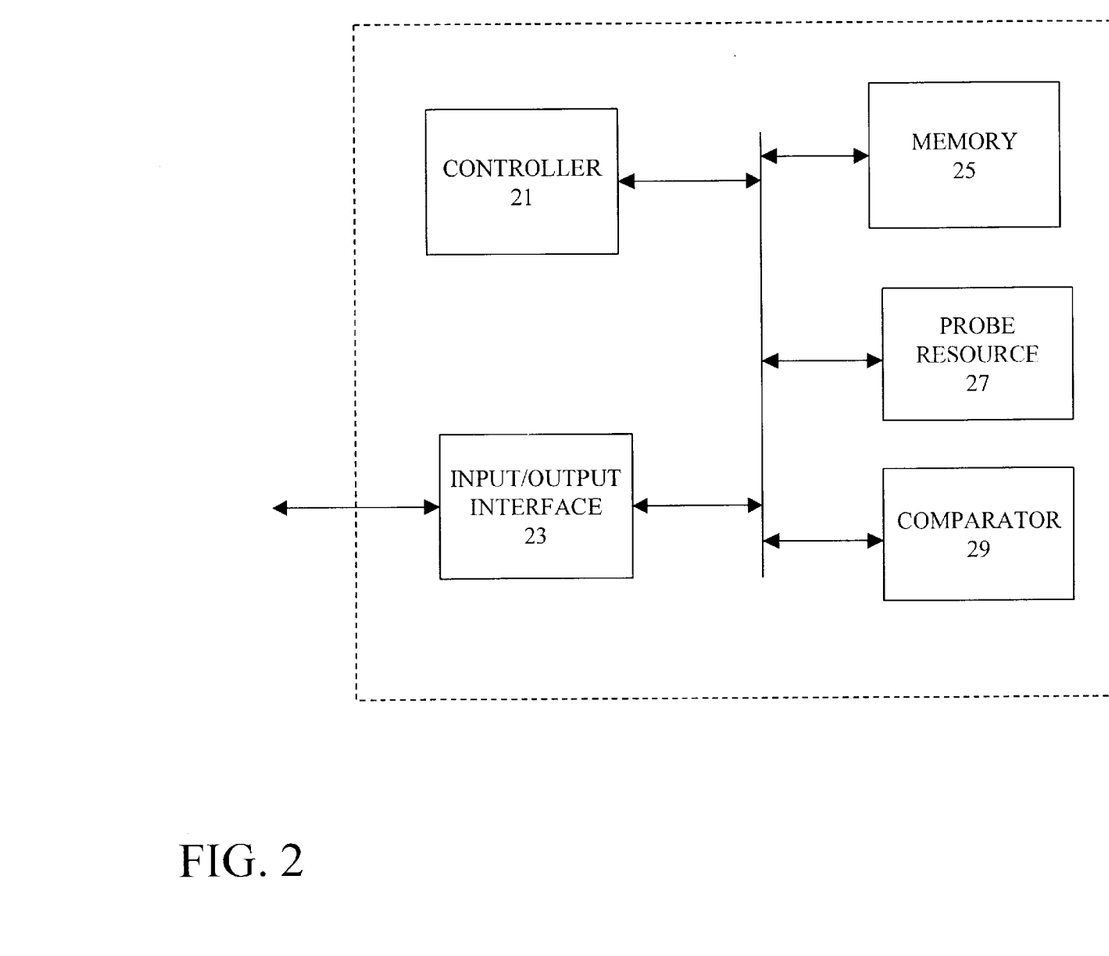
FIG. 2 illustrates a node including a measurement agent of FIG. 1.

FIG. 2 illustrates block diagram of a node including a measurement agent. As illustrated, the node includes a controller 21, an input/output interface 23, and a memory 25. The controller performs general logic functions. The input/output interface provides input and output capability from the node to the computer network 11 (FIG. 1). The memory 25 stores information/data provided by a probe resource 27 and a comparator 29, also included in the node. The probe resource performs a function of forming transmit messages and monitoring receive messages. The comparator receives data regarding the nature of the messages, including the time of transmission of the messages and the time of receipt of the messages. The comparator uses this information to determine available bandwidth between the transmitting node and the receiving node.

Generally, the measurement agent determines the available bandwidth on a path between the node on which the measurement agent resides and a receiving node. The measurement agent does so without knowledge of the physical links making up the path between the measurement agent node and the receiving node, and without knowledge of the network traffic on each of the links making up the path. The measurement agent determines the available bandwidth on the path by transmitting packets to the receiving node that induce congestion, that is take up all of the available bandwidth, on at least one link on the path to the receiving node. The transmitted packets are selected so as to induce the receiving node to respond to the packets by transmitting a return packet to the measurement node.

More particularly, the measurement agent transmits a series of packets to the receiving node, with each of the packets in the series utilizing differing amounts of bandwidth. By monitoring the elapsed time between transmission of any particular packet and the reception of a return packet received in response to the particular packet, the measurement agent determines the available bandwidth over the path.

Figure 3:
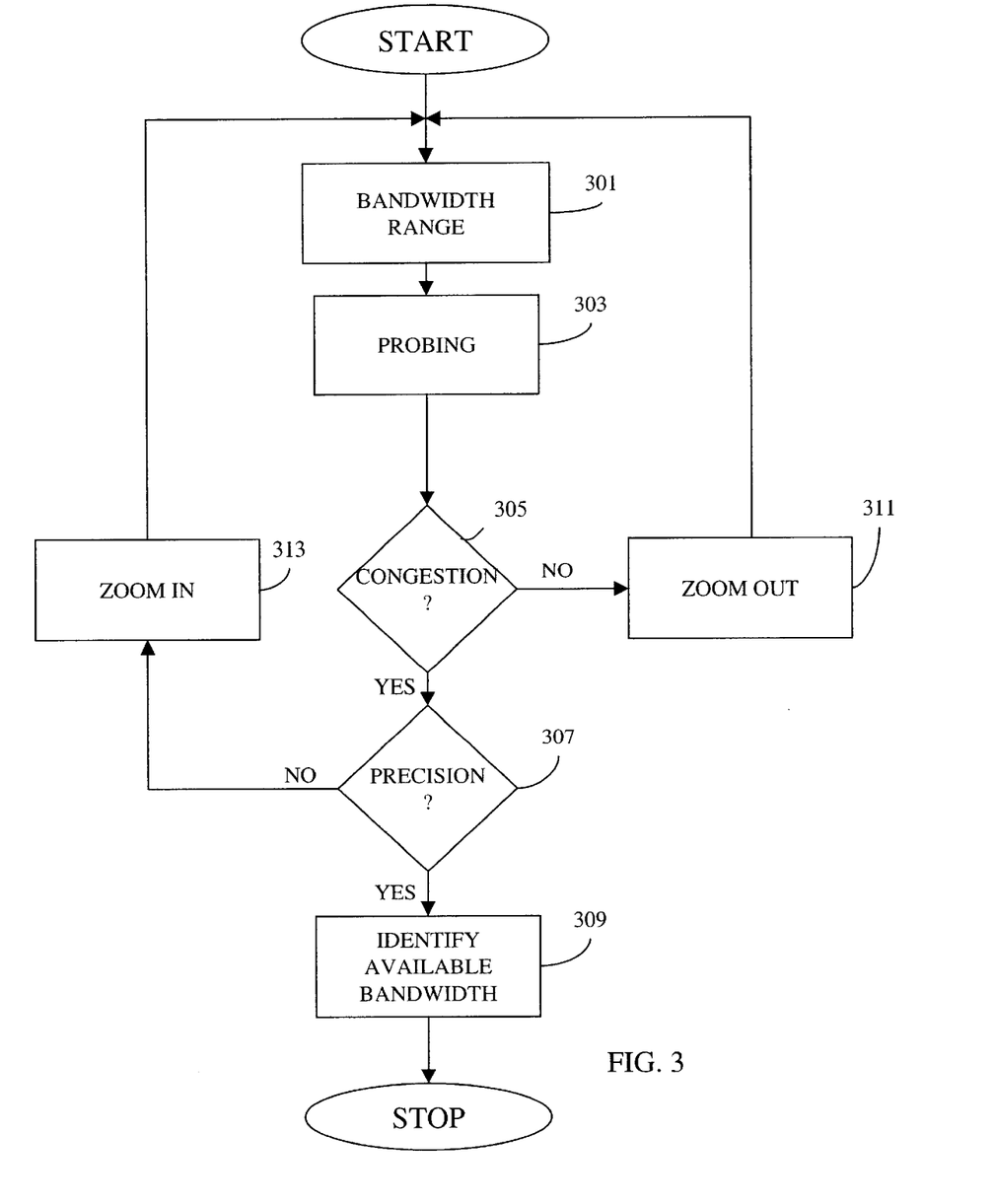
FIG. 3 illustrates a flow diagram of a process for measuring available bandwidth.

The measurement agent in one embodiment of the invention performs a process as illustrated in FIG. 3 to determine the available bandwidth. In block 301 of the process of FIG. 3 the measurement agent determines a bandwidth range which may be a selectable parameter provided to the measurement agent. The bandwidth range is selected such that the available bandwidth is expected to be within the bandwidth range.

Figure 7:
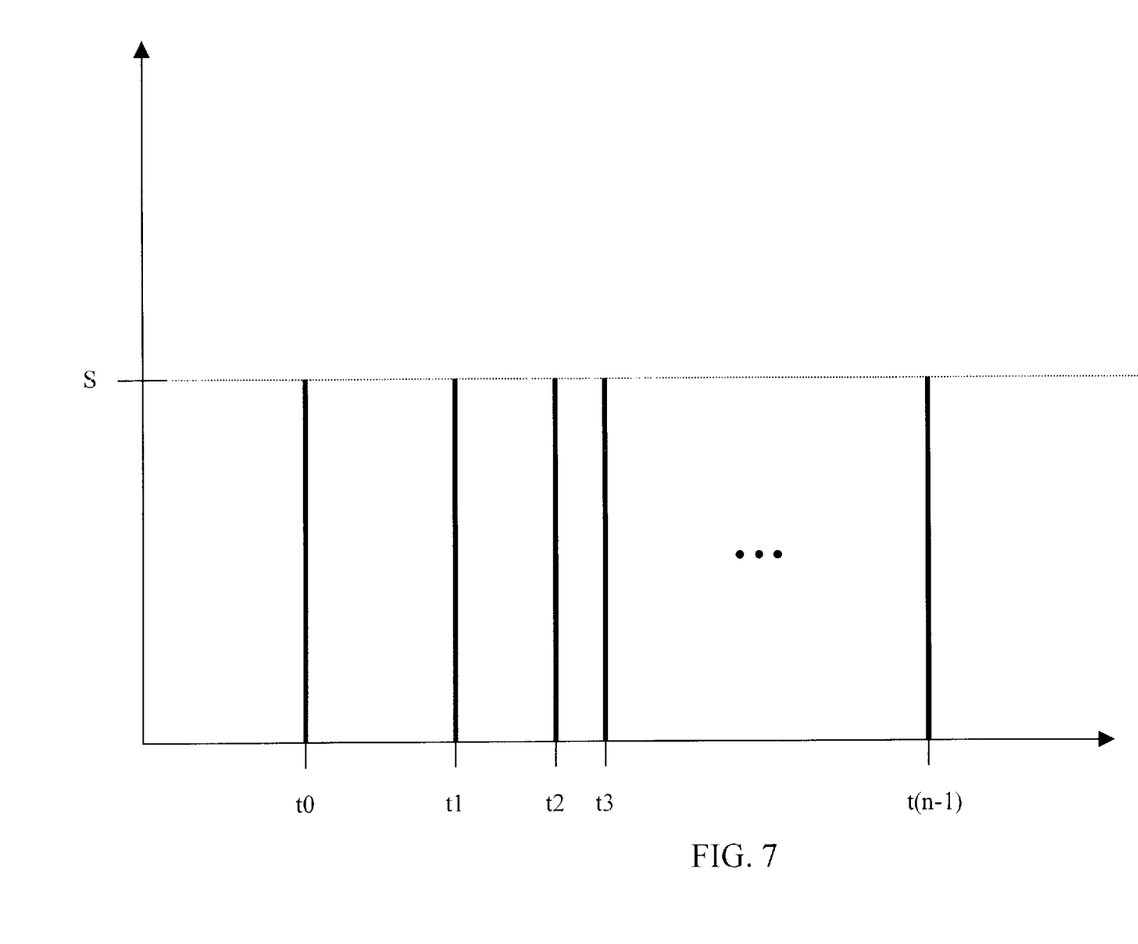
FIG. 7 is a chart plotting transmit packet size and time.

Identification of the bandwidth range allows for determination of packet transmission characteristics to test bandwidth availability within the bandwidth range. In one embodiment the measurement agent tests bandwidth availability by transmitting a series of data packets each having the same size and with decreasing time intervals between the transmission of data packets. FIG. 7 is a chart showing packet size and time of transmission for a series of packets. As illustrated, a first packet of size S is transmitted at time to. A second packet of size S is transmitted at time to $t_0+t_1$. A third packet of size S is transmitted at time $t_0+t_1+t_2$, with $t_2<t_1$. Similarly, a fourth packet is transmitted at time $t_1+t_2+t_3$, with $t_3<t_2<t_1$. Finally, a nth packet is transmitted at time $t_{n-1}$, with $t_{n-1}< \ldots <t_3<t_2<t_1$.

The bandwidth utilized by each of the packets in the series is dependent on the time allowed for the network to complete transmission of the packet. The time allowed for the network to complete transmission of the packet is determined by the time interval between the transmission of one packet in the series by the measurement agent and the transmission of the next packet in the series. In other words, if each packet is size S, and the time interval between packet transmission is $t_i$, then the bandwidth utilized by any packet in the series is $S/t_i$. If $t_i$ decreases as i increases, each succeeding packet in the series utilizes increasing bandwidth. In other embodiments, the time interval between packet transmission is determined by utilizing a predetermined function or a known relationship between the packet size and the time interval, such that bandwidth increases for succeeding packets in the series.

As discussed more fully below, the process is therefore able to determine, based on the lower bandwidth range and the upper bandwidth range, the time interval between transmission of data packets. In other embodiments, however, in order to transmit at varying bandwidth utilization, the size of the data packets is adjusted and the time interval between transmission of data packets remains constant. In yet further embodiments, both the time intervals between transmission of data packet and the size of the data packet are adjusted to cover the bandwidth range.

Figure 4:
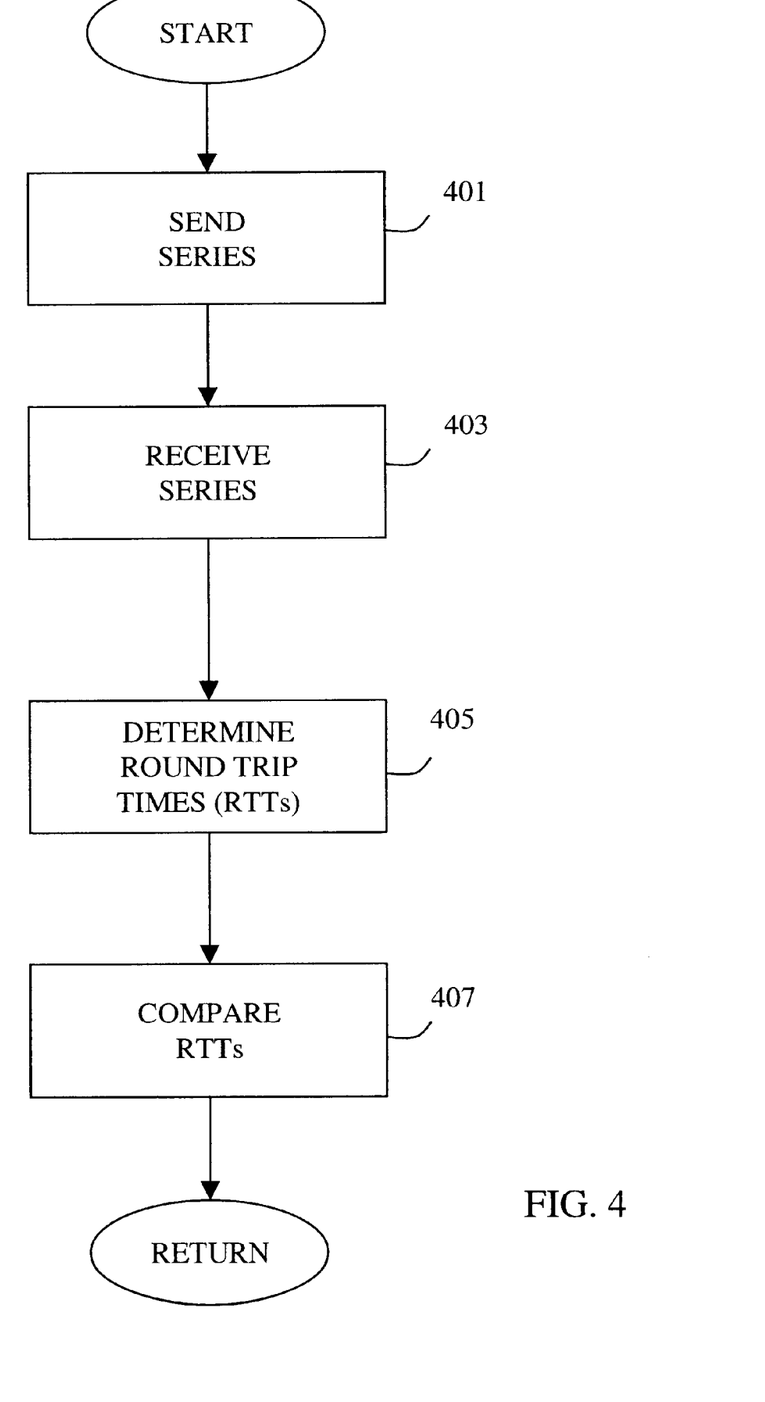
FIG. 4 is a flow diagram of a process for performing a probing function.
Figure 5:
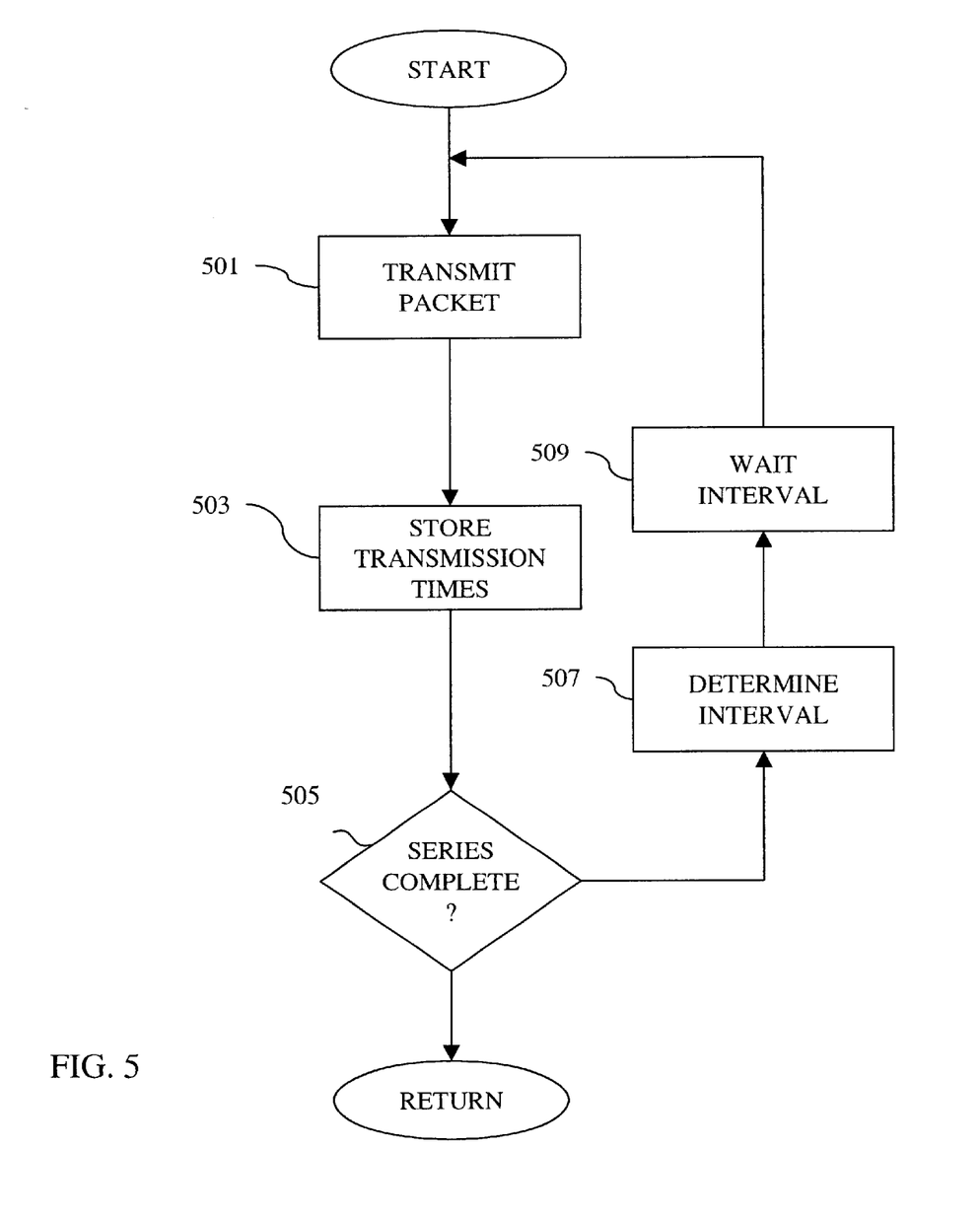
FIG. 5 is a flow chart of a transmit probing packets process.

In block 303, the process performs a probing function. The probing function tests bandwidth availability. A process for performing a probing function is illustrated in FIG. 4. In block 401 of the process of FIG. 4 the measurement agent transmits a series of packets to a receiving node. A process for transmitting a series of data packets is illustrated in FIG. 5. In the process of FIG. 5, a series of packets, each succeeding packet utilizing increasing bandwidth, is transmitted the receiving node. As in the presently described embodiment the packets have the same size, the increase in bandwidth utilization is accomplished by decreasing the time interval between succeeding packets.

In block 501 the process transmits a probing packet. In block 503 the process stores the transmission time of the probing packet. In block 505, the process determines if the series of probing packets is complete. If the series of probing packets is complete the process returns.

Otherwise, in block 507, the process determines the waiting time interval. As previously discussed, the bandwidth utilized by a probing packet of S bits is dependent on the time interval between the packet and a succeeding packet. The longest time interval is the time interval after transmission of the first packet, which utilizes the smallest amount of bandwidth is calculated as $S/B_L$, where $B_L$ is the lower bandwidth limit under test. In other words, $t_i=S/B_L$. Similarly, the smallest time interval between packets is equal to $S/B_H$, where $B_H$ is the upper, or highest, bandwidth limit under test. Further, assuming n probing packets and a constant increase in the time between probing packets, the time interval following the last probing packet is equal to the time interval after the first probing packet plus the sum of the time increments of the intermediate time periods. In other words, with n−1 being the number of probing packets and x being the increase in time interval for transmission of each succeeding packet, $$S/B_L=S/B_H+(n-2)x.$$

Algebraically, $t_i=t_{i+1}+x$ and $x=S(B_H-B_L)/(B_H B_L(n-2))$. Accordingly, $$t_i=(S/(n-2))((n-1-i)/B_L+(i-1)/B_H)$$

Thus, for a series of n−1 probing packets, the process is able to calculate the time interval after transmission of the ith packet in the series.

The process then waits for the appropriate interval, namely $t_i$ for the ith packet, in block 509, and thereafter goes to block 501 for transmission of another packet.

Returning now to the process of FIG. 4, in block 403 the process receives a series of packets from the receiving node. The receiving node is the node to which the transmitted, or probing, packets were directed. As each of the transmitted packets induce the receiving node to reply to these packets, the node containing the measurement agent receives a packet in response to each packet transmitted. The matching transmitted packet in the series and the corresponding return packet may be viewed as a set of packets.

Figure 6:
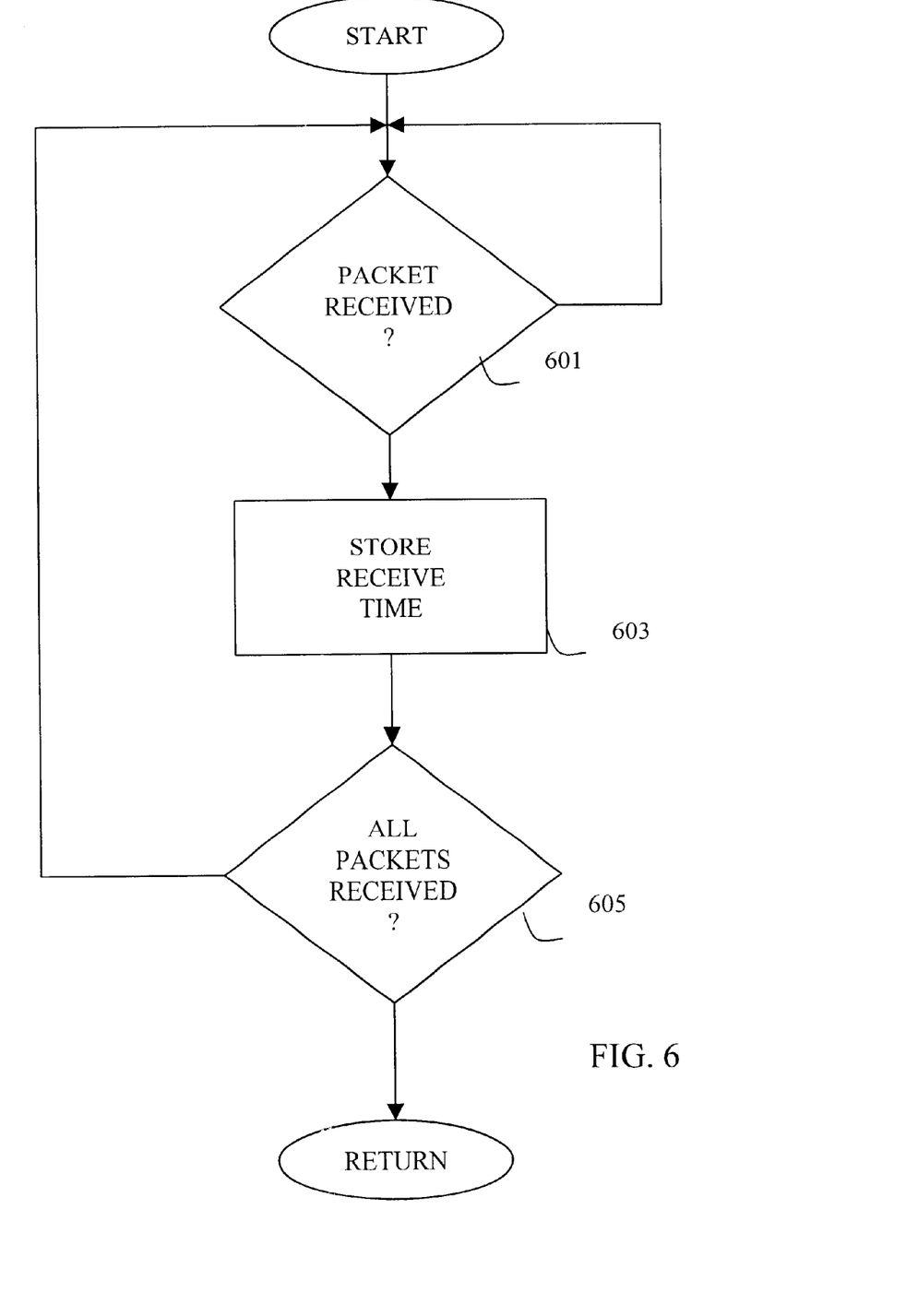
FIG. 6 is a flow diagram of a receive packet process.

A process for receiving packets from the receiving node is illustrated in FIG. 6. In block 601 of FIG. 6, the process checks to see if a packet has been received. If no packet has been received, the process waits for reception of a packet. If the packet has been received, the process stores the received time in block 603. In block 605, the process determines if all packets from a series have been received. If all packets from the series of packets have been received, the process returns. Otherwise the process resumes waiting for reception of a packet in block 601.

Returning once again to the flow diagram of FIG. 4, in block 405 the process determines the round trip time for each of the sets of packets. The round trip time is determined by comparing the transmission time of a packet with the reception time of the corresponding return packet from the receiving node. In block 407 the process compares round trip times for each of the sets of packets. If none of the packets experience congestion, the round trip time for each of the sets of packets should be largely similar. Similarly, if all of the packets experience congestion, the round trip time for all of the sets of packets may also be similar. If, however, some of the packets do not experience congestion while others of the packets do experience congestion, then it is expected that the packets experiencing congestion would have a longer round trip time than those not experiencing congestion. Moreover, it would also be expected that the round trip times for succeeding sets of packets in the series would generally show an increase in round trip times as each succeeding transmitted packet generates additional congestion.

Figure 8:
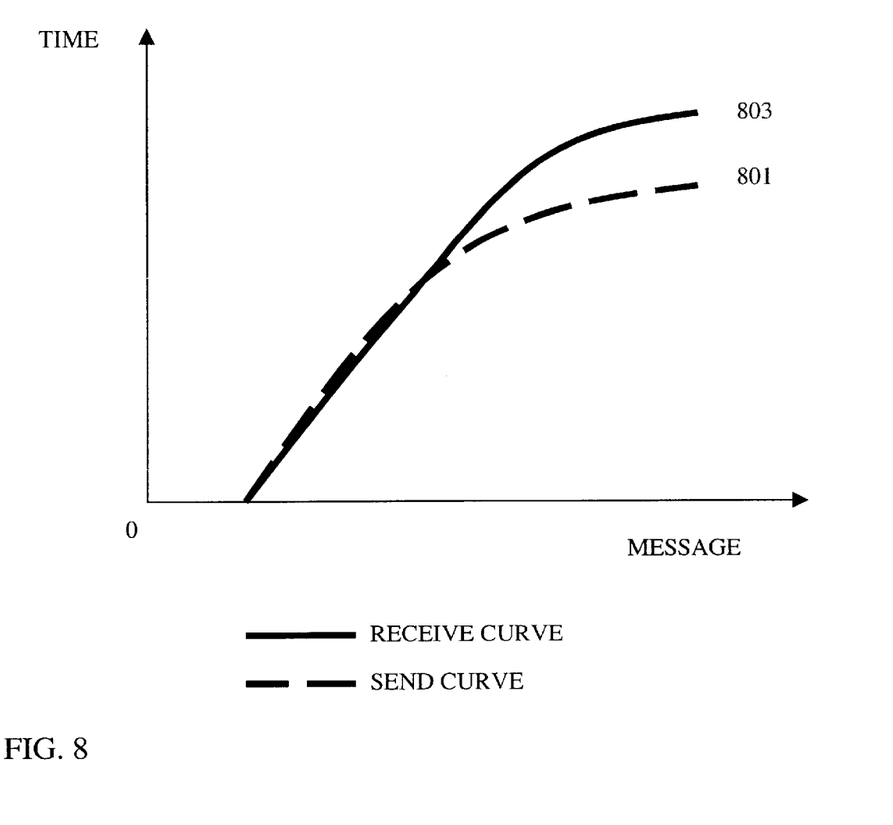
FIG. 8 is a chart plotting time and packet set number.

Accordingly, returning now to the process of FIG. 3, in block 305, the process determines if the round trip times indicate a congestion point. In one embodiment this is accomplished through curve comparison. FIG. 8 illustrates a curve comparison chart showing a relationship between location of a set of packets in a series, time of transmission of a packet and time of receipt of the corresponding packet. A first curve 801 indicates time of transmission. As indicated, for succeeding packets in the series the time interval between packet transmission decreases.

A second curve 803 indicates time of reception of the corresponding packet. The time of reception curve is translated so the first packet set in the series share a common point. The second curve matches the first curve for a number of packet sets, and then diverges. The divergence indicates that the round trip time begins increasing after an identifiable set of packets, and further increases for succeeding sets of packets. Thus, the divergence indicates that the path from the measuring node to the receiving node is congested after the point of divergence, and the point of divergence is a congestion point.

If no congestion point is indicated, however, then the process performs a zoom out function in block 311. The zoom out function increases the covered bandwidth range so as to increase the possibility that a congestion point, and therefore the available bandwidth, may be determined. In one embodiment the zoom out function merely enlarges the bandwidth range by a predefined percentage. After the zoom-out function has been performed, the process returns to the probing function.

If the congestion point has been identified, the process determines if appropriate precision of the congestion point is determinable from the round trip times in block 305. The appropriate precision is provided to the process. The precision of the congestion point is determined by the bandwidth range and the number of probing packets. Thus, for n−1 equally spaced probing packets, the precision is limited to $(B_H-B_L)/(n-2)$. If an insufficient amount of precision is available, the process goes to block 313 and performs a zoom in function. In the zoom in function the bandwidth range under test is decreased about the congestion point by a fixed percentage. Decreasing the bandwidth range about the congestion point allows for increased precision in determination of the available bandwidth.

If a congestion point is identified, and identified with sufficient precision, the process determines the available bandwidth in block 309. The available bandwidth is indicated by the bandwidth that drives the path into congestion. In other words, in a series of packet transmissions, each of which utilize increased bandwidth, the set of packets which first experience increases in round trip time indicate the available bandwidth of the path.

Accordingly, the present invention provides an available bandwidth measurement method and system. Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, and the scope of the invention to be determined by the claims supported by the appended claims and their equivalents rather than the foregoing description.

What is claimed is:

1. A method of determining a network characteristic comprising:

transmitting over a network a plurality of transmitted packets to a recipient destination, the plurality of transmitted packets varying in a ratio of packet size and time interval between packets such that the packets are transmitted between a lower bandwidth limit and an upper bandwidth limit;

receiving over the network a plurality of received packets from the recipient destination, each of the plurality of received packets having a correspondence with packets of the plurality of transmitted packets;

determining if a congestion point exists in a bandwidth range between the lower bandwidth limit and the upper bandwidth limit in the network based on time differences between transmission and reception of the corresponding transmitted packets and received packets; and transmitting over the network a further plurality of transmitted packets, the further plurality of transmitted packets varying in a ratio of packet size and time interval between packets such that the further plurality of transmitted packets are transmitted between a further lower bandwidth limit lower than the lower bandwidth limit of the plurality of transmitted packets and a further upper bandwidth limit higher than the upper bandwidth limit of the plurality of transmitted packets.

2. The method of determining a network characteristic of claim 1 wherein the plurality of transmitted packets comprise a series of transmitted packets.

3. The method of determining a network characteristic of claim 2 wherein each of the transmitted packets forming the series of transmitted packets utilize differing amounts of bandwidth of a transmission medium.

4. The method of determining a network characteristic of claim 3 wherein at least one of the transmitted packets utilize all of the available bandwidth of the transmission medium.

5. The method of determining a network characteristic of claim 4 wherein at least one of the transmitted packets utilize less than all of the available bandwidth of the transmission medium.

6. The method of determining a network characteristic of claim 5 wherein determining if a congestion point exists in a bandwidth range comprises determining the available bandwidth of a path between a measuring node and a receiving node.

7. The method of determining a network characteristic of claim 6 wherein determining the available bandwidth of a path between a measuring node and a receiving node comprises determining which of the time differences between transmission and reception of the corresponding transmitted packets and received packets are greater than other of the time differences between transmission and reception of the corresponding transmitted packets and received packets.

8. The method of determining a network characteristic of claim 5 wherein the series of packets are arranged such that succeeding packets in the series of packets utilize more bandwidth than preceding packets in the series of packets.

9. The method of determining a network characteristic of claim 8 wherein determining if a congestion point exists in a bandwidth range comprises determining available bandwidth over a path from a transmitting node to a recipient destination, the transmitting node transmitting the transmitted packets to the recipient destination and receiving the received packets, by determining which packets in the series of packets exhibit increases in elapsed time from transmission of transmitted packets and reception of received packets with respect to elapsed time from transmission of transmitted packets and reception of received packets for preceding packets in the series of packets.

10. A method of determining bandwidth characteristics of a communications path, the communications path being between a source node and a destination node, comprising:
    sending a first series of packets to the destination node, the series of packets being separated in time, with a decreasing separation in time interval between subsequent packets in the series, the time interval dependent on a bandwidth range having a lower bandwidth limit and an upper bandwidth limit;
    receiving a second series of packets from the destination node, each of the packets in the second series of packets having a correspondence with a packet in the first series of packets, with corresponding packets in the first series of packets and the second series of packets forming a set of packets;
    determining if a congestion point exists in the bandwidth range in the network based on a round trip time for each of the set of packets; and
    sending a third series of packets to the recipient destination, the third series of packets being separated in time, with a decreasing separation in time interval between subsequent packets in the third series, the time interval dependent on a further bandwidth range having a further lower bandwidth limit lower than the lower bandwidth limit of the first series of packets and a further upper bandwidth limit higher than the upper bandwidth limit of the first series of packets.

11. The method of determining bandwidth characteristics of a communications path, the communications path being between a source node and a destination node, of claim 10 further comprising determining which sets of packets exhibits an increase in round trip time with respect to prior sets of packets in the series.

12. A method of determining available bandwidth of a path comprised of a plurality of links comprising:
    selecting a bandwidth range with a lower bandwidth limit and an upper bandwidth limit;
    transmitting a series of packets over the path, the series of packets including packets which utilize bandwidth within the bandwidth range;
    receiving a responsive series of packets over the path, the responsive series of packets being transmitted in response to reception of the series of packets, each packet in the series of packet forming a packet set with a packet in the responsive series of packets; and
    determining if a congestion point exists in the bandwidth range based on the round trip time for each packet set; and
    transmitting a second series of packets over the path, the second series of packets including packets which utilize bandwidth within a second bandwidth range with a further lower bandwidth lower than the lower bandwidth limit of the series of packets and a further upper bandwidth limit higher than the upper bandwidth limit of the series of packets.

13. The method of determining available bandwidth of a path comprised of a plurality of links of claim 12 further comprising
    determining whether the bandwidth range includes a congestion point.

14. The method of determining available bandwidth of a path comprised of a plurality of links of claim 13 wherein determining whether the bandwidth range includes a congestion point comprises determining if round trip times for sets of packets utilizing a greater amount of bandwidth exceeds round trip times for sets of packets utilizing a lesser amount of bandwidth.

15. The method of determining available bandwidth of a path comprised of a plurality of links of claim 14 further comprising expanding the bandwidth range if the bandwidth does not include a congestion point.

16. The method of determining available bandwidth of a path comprised of a plurality of links of claim 15 wherein the series of packets are substantially evenly spread within the bandwidth range in terms of utilization of bandwidth.

17. The method of determining available bandwidth of a path comprised of a plurality of links of claim 16 wherein the packets in the series of packets are substantially the same size.

18. The method of determining available bandwidth of a path comprised of a plurality of links of claim 17 wherein the packets in the series of packets are transmitted with varying time intervals with respect to each other.

19. The method of determining available bandwidth of a path comprised of a plurality of links of claim 18 further comprising shrinking the bandwidth range about the congestion point if a difference in bandwidth utilization of adjoining packets in the series of packets is greater than a predefined value.

20. The method of determining available bandwidth of a path comprised of a plurality of links of claim 16 wherein the packets of the series of packets vary in size.

21. The method of determining available bandwidth of a path comprised of a plurality of links of claim 20 wherein the packets in the series of packets are transmitted with varying time intervals with respect to each other.

22. A measurement agent determining a network characteristic comprising:
    computing means transmitting over a network a plurality of transmitted packets to a recipient destination, the plurality of transmitted packets varying in a ratio of packet size and time interval between packets such that the packets are transmitted between a lower bandwidth limit and an upper bandwidth limit and receiving over the network a plurality of received packets; from the recipient destination, each of the plurality of received packets having a correspondence with packets of the plurality of transmitted packets, the computer means determines if a congestion point exists in a bandwidth range between the lower bandwidth limit and the upper bandwidth limit in the network based on time differences between transmission and reception of the corresponding transmitted packets and received packets, and the computer means transmitting over the network a further plurality of transmitted packets, the further plurality of transmitted packets varying in a ratio of packet size and time interval between packets such that the further plurality of transmitted packets are transmitted between a further lower bandwidth limit lower than the lower bandwidth limit of the plurality of transmitted packets and a further upper bandwidth limit higher than the upper bandwidth limit of the plurality of transmitted packets.

23. The measurement agent of claim 22 wherein the plurality of transmitted packets comprise a series of transmitted packets, the series of packets being arranged such that succeeding packets in the series of packets utilize more bandwidth than preceding packets in the series of packets.

24. The measurement agent of claim 23 wherein the computer means determines available bandwidth over a path to the recipient destination by determining which packets in the series of packets exhibit increases in elapsed time from transmission of transmitted packets and reception of received packets with respect to elapsed time from transmission of transmitted packets and reception of received packets for preceding packets in the series of packets.

25. A method of determining a network characteristic comprising:
   transmitting over a network a plurality of transmitted packets to a recipient destination, the plurality of transmitted packets varying in a ratio of packet size and time interval between packets such that the packets are transmitted between a lower bandwidth limit and an upper bandwidth limit;
   receiving over the network a plurality of received packets from the recipient destination, each of the plurality of received packets having a correspondence with packets of the plurality of transmitted packets;
   determining if a congestion point exists with sufficient precision in a bandwidth range between the lower bandwidth limit and the upper bandwidth limit in the network based on time differences between transmission and reception of the corresponding transmitted packets and received packets; and
   transmitting over the network a further plurality of transmitted packets, the further plurality of transmitted packets varying in a ratio of packet size and time interval between packets such that the further plurality of transmitted packets are transmitted between a further lower bandwidth limit higher than the lower bandwidth limit of the plurality of transmitted packets and a further upper bandwidth limit lower than the upper bandwidth limit of the plurality of transmitted packets.

26. A method of determining bandwidth characteristics of a communications path, the communications path being between a source node and a destination node, comprising:
   sending a first series of packets to the destination node, the series of packets being separated in time, with a decreasing separation in time interval between subsequent packets in the series, the time interval dependent on a bandwidth range having a lower bandwidth limit and an upper bandwidth limit;
   receiving a second series of packets from the destination node, each of the packets in the second series of packets having a correspondence with a packet in the first series of packets, with corresponding packets in the first series of packets and the second series of packets forming a set of packets;
   determining if a congestion point exists with sufficient precision in the bandwidth range in the network based on a round trip time for each of the set of packets; and
   sending a third series of packets to the recipient destination, the third series of packets being separated in time, with a decreasing separation in time interval between subsequent packets in the third series, the time interval dependent on a further bandwidth range having a further lower bandwidth limit higher than the lower bandwidth limit of the first series of packets and a further upper bandwidth limit lower than the upper bandwidth limit of the first series of packets.

27. A method of determining available bandwidth of a path comprised of a plurality of links comprising:
   selecting a bandwidth range with a lower bandwidth limit and an upper bandwidth limit;
   transmitting a series of packets over the path, the series of packets including packets which utilize bandwidth within the bandwidth range;
   receiving a responsive series of packets over the path, the responsive series of packets being transmitted in response to reception of the series of packets, each packet in the series of packet forming a packet set with a packet in the responsive series of packets; and
   determining if a congestion point exists with sufficient precision in the bandwidth range based on the round trip time for each packet set; and
   transmitting a second series of packets over the path, the second series of packets including packets which utilize bandwidth within a second bandwidth range with a further lower bandwidth higher than the lower bandwidth limit of the series of packets and a further upper bandwidth limit lower than the upper bandwidth limit of the series of packets.

28. A measurement agent determining a network characteristic comprising:
   computing means transmitting over a network a plurality of transmitted packets to a recipient destination, the plurality of transmitted packets varying in a ratio of packet size and time interval between packets such that the packets are transmitted between a lower bandwidth limit and an upper bandwidth limit and receiving over the network a plurality of received packets from the recipient destination, each of the plurality of received packets having a correspondence with packets of the plurality of transmitted packets, the computer means determines if a congestion point exists with sufficient precision in a bandwidth range between the lower bandwidth limit and the upper bandwidth limit in the network based on time differences between transmission and reception of the corresponding transmitted packets and received packets, and the computer means transmitting over the network a further plurality of transmitted packets, the further plurality of transmitted packets varying in a ratio of packet size and time interval between packets such that the further plurality of transmitted packets are transmitted between a further lower bandwidth limit higher than the lower bandwidth limit of the plurality of transmitted packets and a further upper bandwidth limit lower than the upper bandwidth limit of the plurality of transmitted packets.

* * * * *